United States Patent
Ichikawa

(10) Patent No.: US 7,989,978 B2
(45) Date of Patent: Aug. 2, 2011

(54) POWER SUPPLY SYSTEM, VEHICLE WITH THE SAME, CONTROL METHOD OF POWER SUPPLY SYSTEM AND COMPUTER-READABLE RECORDING MEDIUM BEARING PROGRAM CAUSING COMPUTER TO EXECUTE CONTROL METHOD OF POWER SUPPLY SYSTEM

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 322 days.

(21) Appl. No.: 12/311,015

(22) PCT Filed: Oct. 2, 2007

(86) PCT No.: PCT/JP2007/069646
§ 371 (c)(1),
(2), (4) Date: Mar. 17, 2009

(87) PCT Pub. No.: WO2008/050601
PCT Pub. Date: May 2, 2008

(65) Prior Publication Data
US 2010/0001583 A1    Jan. 7, 2010

(30) Foreign Application Priority Data
Oct. 24, 2006    (JP) .................................. 2006-288877

(51) Int. Cl.
*B60L 3/00* (2006.01)
(52) U.S. Cl. ............................. 307/9.1; 307/82; 320/136
(58) Field of Classification Search .................. 307/9.1, 307/10.1, 55, 58, 82, 85–87; 320/134, 136, 320/150; 429/62
See application file for complete search history.

(56) References Cited

U.S. PATENT DOCUMENTS

| | | | | |
|---|---|---|---|---|
| 7,795,844 B2 * | 9/2010 | Ichikawa et al. | ............... | 320/134 |
| 7,847,432 B2 * | 12/2010 | Ichikawa | ....................... | 307/9.1 |
| 2002/0003417 A1 | 1/2002 | Bito et al. | | |
| 2003/0107352 A1 | 6/2003 | Downer et al. | | |

(Continued)

FOREIGN PATENT DOCUMENTS

JP    A-07-079503    3/1995

(Continued)

OTHER PUBLICATIONS

U.S. Appl. No. 12/225,119, filed Sep. 15, 2008 in the name of Ichikawa et al.

(Continued)

*Primary Examiner* — Fritz M Fleming
(74) *Attorney, Agent, or Firm* — Oliff & Berridge, PLC

(57) ABSTRACT

A temperature increase power command producing unit produces a temperature increase power command value for transferring a power between power storage devices when heating control for raising temperature of the power storage device is performed. The temperature increase power command producing unit provides the temperature increase power command value to a current control unit, and provides a command value prepared by inverting a sign of the temperature increase power command value to a current control unit. The current control unit performs current control based on a first current command value and the temperature increase power command value, and the current control unit performs current control based on the second current command value and the command value prepared by inverting the sign of the temperature increase power command value.

12 Claims, 9 Drawing Sheets

U.S. PATENT DOCUMENTS

| | | | |
|---|---|---|---|
| 2009/0067202 A1* | 3/2009 | Ichikawa et al. | 363/79 |
| 2009/0195067 A1* | 8/2009 | Ichikawa et al. | 307/9.1 |
| 2009/0289497 A1* | 11/2009 | Ichikawa et al. | 307/9.1 |
| 2009/0315403 A1* | 12/2009 | Ichikawa et al. | 307/82 |
| 2010/0001866 A1* | 1/2010 | Ichikawa et al. | 320/150 |
| 2010/0019728 A1* | 1/2010 | Ichikawa et al. | 320/134 |

FOREIGN PATENT DOCUMENTS

| | | |
|---|---|---|
| JP | A-2001-314039 | 11/2001 |
| JP | A-2003-209969 | 7/2003 |
| JP | A-2003-274565 | 9/2003 |
| JP | A-2004-147477 | 5/2004 |
| JP | A-2006-121874 | 5/2006 |

OTHER PUBLICATIONS

U.S. Appl. No. 12/308,228, filed Dec. 10, 2008 in the name of Ichikawa et al.

Japanese Office Action issued in Japanese Patent Application No. 2006-288877, on Mar. 30, 2010, with English translation.

* cited by examiner

POWER SUPPLY SYSTEM, VEHICLE WITH THE SAME, CONTROL METHOD OF POWER SUPPLY SYSTEM AND COMPUTER-READABLE RECORDING MEDIUM BEARING PROGRAM CAUSING COMPUTER TO EXECUTE CONTROL METHOD OF POWER SUPPLY SYSTEM

TECHNICAL FIELD

The invention relates to a control technique for increasing a temperature of a power storage device included in a power supply system.

BACKGROUND ART

In recent years, vehicles such as a hybrid vehicle and an electric vehicle that are equipped with an electric motor as a power source have been improved to increase a capacity of a power storage unit for improving drive performance such as acceleration performance and a continuous travel distance. A structure having a plurality of power storage devices has been proposed as means for increasing the capacity of the power storage unit.

A Japanese Patent Laying-Open No. 2003-209969 has disclosed a power supply control system provided with a plurality of power supply stages. This power supply control system includes a plurality of power supply stages that are connected in parallel together and supply a DC power to at least one inverter. Each power supply stage includes a battery and a boost/buck DC-DC converter.

In this power supply control system, the plurality of power supply stages are controlled to maintain an output voltage for the inverter by uniformly charging and discharging a plurality of batteries that are included in the power supply stages, respectively.

Generally, in a power storage device such as a secondary battery and a capacitor, a capacity lowers with lowering of a temperature so that a charge/discharge property deteriorates with it. In the hybrid vehicle and others, therefore, the power storage device must be rapidly heated when the temperature of the power storage device is low. Particular, in system having a plurality of power storage devices such as the power supply control system disclosed in the above Japanese Patent Laying-Open No. 2003-209969, it is necessary to increase rapidly a temperature of the power storage device for sufficiently bringing out merits of the large capacity of power storage units.

However, the above Japanese Patent Laying-Open No. 2003-209969 has merely disclosed that the plurality of batteries included in the power supply stages respectively are uniformly charged and discharged in using the power storage device, and has not particularly disclosed a method for rapidly increasing a temperature of the plurality of power storage devices.

Further, from the viewpoint of cost and reliability, it is desired that a control circuit(s) or a quantity of control operation added for rapidly increasing a temperature of the plurality of power storage devices is as small as possible.

DISCLOSURE OF THE INVENTION

Accordingly, an object of the invention is to provide a power supply system that can rapidly increase a temperature of a power storage unit by a simple structure as well as a vehicle provided with the power supply system.

Another object of the invention is to provide a control method of a power supply system that can rapidly increase a temperature of a power storage unit by a simple method as well as a computer-readable recording medium that bears a program for causing a computer to perform the control method.

According to the invention, a power supply system capable of transferring a power to and from a load device, includes a plurality of power storage devices, a power line, a plurality of converters and a control device. The plurality of power storage devices are chargeable. The power line is provided for transferring a power between the power supply system and the load device. The plurality of converters are provided corresponding to the plurality of power storage devices, respectively, and each performs voltage conversion between the corresponding power storage device and the power line. The control device controls the plurality of converters. The control device includes a first and second command producing units and a control unit. The first command producing unit produces a first power command for transferring the power between the power supply system and the load device. The second command producing unit produces a second power command for transferring the power between the plurality of power storage devices when temperature increase control is performed for increasing a temperature of at least one of the plurality of power storage devices. The control unit controls the plurality of converters such that the power indicated by the first power command is transferred between the power supply system and the load device, and the power indicated by the second power command is transferred between the plurality of power storage devices.

Preferably, the second command producing unit produces the second power command when a temperature of at least one of the plurality of power storage devices is lower than a specified value.

Preferably, the second command producing unit produces the second power command such that a sum of power command values produced as the second power command for each of the plurality of converters becomes equal to zero.

Preferably, the first command producing unit produces the first power command such that a voltage on the power line attains a predetermined value.

Preferably, the control unit controls the plurality of converters based on a third power command prepared by adding the second power command to the first power command.

According to the invention, a vehicle includes any one of the power supply systems described above, and a drive power generating unit. The drive power generating unit generates a drive power of the vehicle by receiving a power supplied from the power supply system.

Also, the invention provides a control method of a power supply system capable of transferring a power to and from a load device. The power supply system includes a plurality of power storage devices, a power line and a plurality of converters. The plurality of power storage devices are chargeable. The power line is provided for transferring a power between the power supply system and the load device. The plurality of converters are provided corresponding to the plurality of power storage devices, respectively, and each performs voltage conversion between the corresponding power storage device and the power line. The control method includes first to third steps. The first step produces a first power command for transferring the power between the power supply system and the load device. The second step produces a second power command for transferring the power between the plurality of power storage devices when temperature increase control is performed for increasing a temperature of at least one of the plurality of power storage devices. The third step controls the plurality of converters such that the power indicated by the first power command is transferred between the power supply system and the load device, and the power indicated by the second power command is transferred between the plurality of power storage devices.

Preferably, in the second step, the second power command is produced when a temperature of at least one of the plurality of power storage devices is lower than a specified value.

Preferably, in the second step, the second power command is produced such that a sum of power command values produced as the second power command for each of the plurality of converters becomes equal to zero.

Preferably, in the first step, the first power command is produced such that a voltage on the power line attains a predetermined value.

Preferably, in the third step, the plurality of converters is controlled based on a third power command prepared by adding the second power command to the first power command.

Further, the invention provides a computer-readable recording medium bearing a program for causing a computer to execute any one of the control methods described above.

In the invention, the second power command for transferring the power (i.e., electric power) between the plurality of power storage devices is produced when the temperature increase control is performed for increasing a temperature of at least one of the plurality of power storage devices. The power is transferred between the power supply system and the load device according to the first power command produced for transferring the power between the power supply system and the load device. Further, at the time of the temperature increase control, the power is transferred between the plurality of power storage devices according to the second power command.

Accordingly, the invention can employ the simple structure for rapidly increasing a temperature of the power storage device while transferring the power between the power supply system and the load device.

BEST MODES FOR CARRYING OUT THE INVENTION

Embodiments of the invention will be described below with reference to the drawings. In the figures, the same or corresponding components bear the same reference numbers, and description thereof is not repeated.

First Embodiment

Figure 1:
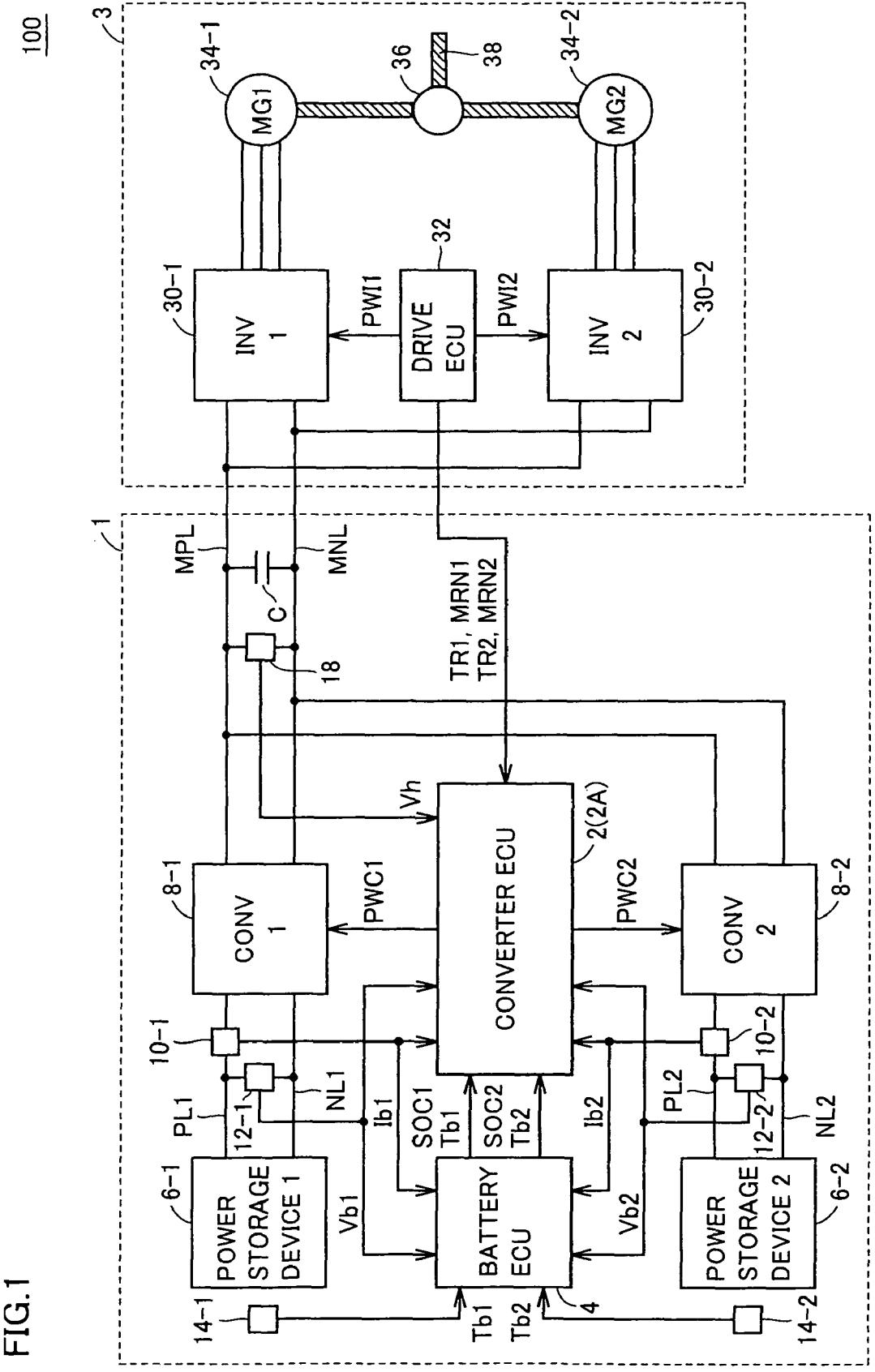
FIG. 1 is an overall block diagram of a vehicle equipped with a power supply system according to a first embodiment of the invention.

FIG. 1 is an overall block diagram of a vehicle equipped with a power supply system of a first embodiment of the invention. Referring to FIG. 1, a vehicle 100 includes a power supply system 1 and a drive power generating unit 3. Drive power generating unit 3 includes inverters 30-1 and 30-2, motor generators 34-1 and 34-2, a power transmission mechanism 36, a drive shaft 38 and a drive ECU (Electronic Control Unit) 32.

Inverters 30-1 and 30-2 are connected in parallel to a main positive bus line MPL and a main negative bus line MNL. Inverters 30-1 and 30-2 convert the drive powers (DC powers) supplied from power supply system 1, and provide them to motor generators 34-1 and 34-2, respectively. Inverters 30-1 and 30-2 convert the AC powers generated by motor generators 34-1 and 34-2 into DC powers, respectively, and provide them as regenerative powers to power supply system 1.

Each of inverters 30-1 and 30-2 is formed of, e.g., a bridge circuit including three-phase switching elements. Inverters 30-1 and 30-2 perform switching operations according to drive signals PWI1 and PWI2 provided from drive ECU 32, and thereby drive the corresponding motor generators, respectively.

Motor generators 34-1 and 34-2 receive the AC powers from inverters 30-1 and 30-2, and thereby generate the rotational drive powers, respectively. Motor generators 34-1 and 34-2 receive externally supplied rotational power, and thereby generate the AC powers. Each of motor generators 34-1 and 34-2 is formed of, e.g., a three-phase AC rotary motor provided with a rotor having an embedded permanent magnet. Motor generators 34-1 and 34-2 are coupled to power transmission mechanism 36 for transmitting the rotational drive power to wheels (not shown) via drive shaft 38 coupled to power transmission mechanism 36.

In the case where drive power generating unit 3 is employed in the hybrid vehicle, motor generators 34-1 and 34-2 are also coupled to an engine (not shown) via power transmission mechanism 36 or drive shaft 38. Drive ECU 32 executes the control to achieve an optimum ratio between the drive power generated by the engine and the drive powers generated by motor generators 34-1 and 34-2. In this structure employed in the hybrid vehicle, one of motor generators 34-1 and 34-2 may be operated exclusively as an electric motor, and the other motor generator may be operated exclusively as a power generator.

Drive ECU 32 operates based on signals, running conditions and an accelerator press-down degree and the like transmitted from various sensors (not shown), and thereby calculates torque target values TR1 and TR2 as well as revolution speed target values MRN1 and MRN2 of motor generators 34-1 and 34-2, respectively. Drive ECU 32 produces drive signal PWI1 to control inverter 30-1 such that the generated torque and revolution speed of motor generator 34-1 may attain torque target value TR1 and revolution speed target value MRN1, respectively. Also, drive ECU 32 produces drive signal PWI2 to control inverter 30-2 such that the generated torque and revolution speed of motor generator 34-2 may attain torque target value TR2 and revolution speed target value MRN2, respectively. Further, drive ECU 32 provides torque target values TR1 and TR2 as well as revolution speed target values MRN1 and N2 thus calculated to a converter ECU 2 (to be described later) of power supply system 1.

Power supply system 1 includes power storage devices 6-1 and 6-2, converters 8-1 and 8-2, a smoothing capacitor C, converter ECU 2, a battery ECU 4, current sensors 10-1 and 10-2, voltage sensors 12-1, 12-2 and 18, and temperature sensors 14-1 and 14-2.

Power storage devices 6-1 and 6-2 are chargeable and dischargeable DC power supplies, and each are formed of a secondary battery such as a nickel hydrogen battery or a lithium ion battery. Power storage device 6-1 is connected to converter 8-1 via positive and negative lines PL1 and NL1. Power storage device 6-2 is connected to converter 8-2 via positive and negative lines PL2 and NL2. At least one of power storage devices 6-1 and 6-2 may be an electrical double layer capacitor.

Converter 8-1 is provided between power storage device 6-1 and the pair of main positive bus line MPL and main negative bus line MNL, and performs the voltage conversion between power storage device 6-1 and the pair of main positive bus line MPL and main negative bus line MNL based on a drive signal PWC1 from converter ECU 2. Converter 8-2 is provided between power storage device 6-2 and the pair of main positive bus line MPL and main negative bus line MNL, and performs the voltage conversion between power storage device 6-2 and the pair of main positive bus line MPL and main negative bus line MNL based on a drive signal PWC2 from converter ECU 2.

Smoothing capacitor C is connected between main positive bus line MPL and main negative bus line MNL, and reduces power variation components included in main positive bus line MPL and main negative bus line MNL. Voltage sensor 18 senses a voltage Vh between main positive bus line MPL and main negative bus line MNL, and provides a result of the sensing to converter ECU 2.

Current sensors 10-1 and 10-2 sense currents of values Ib1 and Ib2 provided to/from power storage devices 6-1 and 6-2, respectively, and each provide a result of the sensing to converter ECU 2 and battery ECU 4. Current sensors 10-1 and 10-2 sense the currents (discharge currents) supplied from the corresponding power storage devices as positive values, and sense the currents (charge currents) supplied to the corresponding power storage devices as negative values, respectively. In the structure shown in FIG. 1, current sensors 10-1 and 10-2 sense the current values of positive lines PL1 and PL2, respectively. However, current sensors 10-1 and 10-2 may sense the currents of negative lines NL1 and NL2, respectively.

Voltage sensors 12-1 and 12-2 sense voltage values Vb1 and Vb2 of power storage devices 6-1 and 6-2, respectively, and each provide a result of the sensing to converter ECU 2 and battery ECU 4. Temperature sensors 14-1 and 14-2 sense internal temperatures Tb1 and Tb2 of power storage devices 6-1 and 6-2, respectively, and provide results of the sensing to battery ECU 4.

Battery ECU 4 calculates a state quantity SOC1 that represents an SOC (State Of Charge) of power storage device 6-1, based on current value Ib1 from current sensor 10-1, voltage value Vb1 from voltage sensor 12-1 and temperature Tb1 from temperature sensor 14-1, and provides state quantity SOC1 thus calculated to converter ECU 2 together with temperature Tb1.

Battery ECU 4 calculates a state quantity SOC2 that represents a state of charge of power storage device 6-2, based on current value Ib2 from current sensor 10-2, voltage value Vb2 from voltage sensor 12-2 and temperature Tb2 from temperature sensor 14-2, and provides state quantity SOC2 thus calculated to converter ECU 2 together with temperature Tb2.

Various known methods may be employed for calculating state quantities SOC1 and SOC2.

Converter ECU 2 produces drive signals PWC1 and PWC2 for driving converters 8-1 and 8-2, respectively, based on various sensed values provided from current sensors 10-1 and 10-2, voltage sensors 12-1 and 12-2, and voltage sensor 18 as well as temperatures Tb1 and Tb2 and state quantities SOC1 and SOC2 provided from battery ECU 4, and torque target values TR1 and TR2 and revolution speed target values MRN1 and MRN2 provided from drive ECU 32. Converter ECU 2 provides drive signals PWC1 and PWC2 thus produced to converters 8-1 and 8-2 for controlling converters 8-1 and 8-2, respectively. A structure of converter ECU 2 will be described later in detail.

Figure 2:
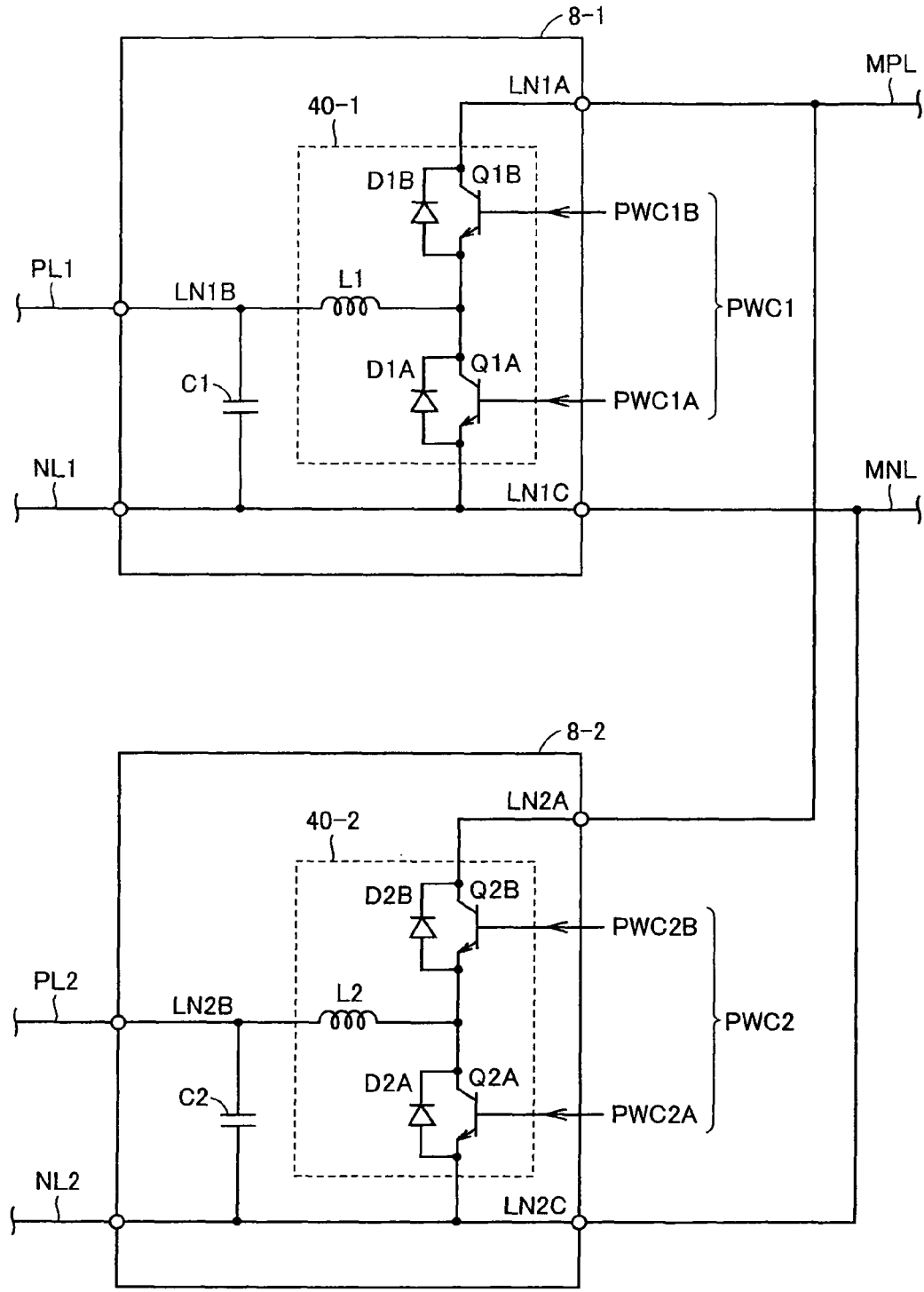
FIG. 2 shows schematic structures of converters shown in FIG. 1.

FIG. 2 shows schematic structures of converters 8-1 and 8-2 shown in FIG. 1. A structure and an operation of converter 8-2 are substantially the same as those of converter 8-1, and therefore the following description will be given on the structure and operation of converter 8-1. Referring to FIG. 2, converter 8-1 includes a chopper circuit 40-1, a positive bus line LN1A, a negative bus line LN1C, an interconnection LN1B and a smoothing capacitor C1. Chopper circuit 40-1 includes transistors Q1A and Q1B, diodes D1A and D1B, and an inductor L1.

One of ends of positive bus line LN1A is connected to a collector of transistor Q1B, and the other is connected to main positive bus line MPL. One of ends of negative bus line LN1C is connected to negative line NL1, and the other is connected to main negative bus line MNL.

Transistors Q1A and Q1B are connected in series between negative bus line LN1C and positive bus line LN1A. Specifically, an emitter of transistor Q1A is connected to negative bus line LN1C, and a collector of transistor Q1B is connected to positive bus line LN1A. Diodes D1A and D1B are connected in antiparallel to transistors Q1A and Q1B, respectively. Inductor L1 is connected to a node between transistors Q1A and Q1B.

One end of interconnection LN1B is connected to positive line PL1, and the other end is connected to inductor L1. Smoothing capacitor C1 is connected between interconnection LN1B and negative bus line LN1C, and reduces AC components included in the DC voltage between interconnection LN1B and negative bus line LN1C.

Chopper circuit 40-1, in response to drive signal PWC1 from converter ECU 2 (not shown), boosts the DC power (drive power) received from positive and negative lines PL1 and NL1 during the discharge operation of power storage device 6-1, and steps down the DC power (regenerative power) received from main positive bus line MPL and main negative bus line MNL during the charge operation of power storage device 6-1.

Voltage converting operations (boosting and stepping down operations) of converter 8-1 will now be described. In the boosting operation, converter ECU 2 keeps transistor Q1B off, and turns on/off transistor Q1A with a predetermined duty ratio. During the on period of transistor Q1A, a discharge current flows from power storage device 6-1 to main positive bus line MPL via interconnection LN1B, inductor L1, diode D1B and positive bus line LN1A. Simultaneously, a pump current flows from power storage device 6-1 via interconnection LN1B, inductor L1, transistor Q1A and negative bus line LN1C. Inductor L1 accumulates an electromagnetic energy by this pump current. When transistor Q1A changes from the on state to the off state, inductor L1 superimposes the accumulated electromagnetic energy on the discharge current. Consequently, an average voltage of the DC power supplied from converter 8-1 to main positive bus line MPL and main negative bus line MNL is boosted by a magnitude corresponding to the electromagnetic energy accumulated in inductor L1 according to the duty ratio.

In the stepping down operation, converter ECU 2 turns on/off transistor Q1B with a predetermined duty ratio, and keeps transistor Q1A off. During the off period of transistor Q1B, the charge current flows from main positive bus line MPL to power storage device 6-1 via positive bus line LN1A, transistor Q1B, inductor L1 and interconnection LN1B. When transistor Q1B changes from the on state to the off state, inductor L1 generates a magnetic flux that may prevent changes in current so that the charge current continues the flowing via diode D1A, inductor L1 and interconnection LN1B. From the viewpoint of the electric energy, main positive bus line MPL and main negative bus line MNL supply the DC power only during the on period of transistor Q1B, and therefore the average voltage of the DC power supplied from converter 8-1 to power storage device 6-1 takes a value obtained by multiplying the DC voltage between main positive bus line MPL and main negative bus line MNL by the duty ratio, assuming that the charge current is kept constant (i.e., inductor L1 has a sufficiently large inductance).

For controlling the voltage converting operation of converter 8-1, converter ECU 2 produces drive signal PWC1 formed of a drive signal PWC1A for controlling on/off of transistor Q1A and a drive signal PWC1B for controlling on/off of transistor Q1B.

Figure 3:
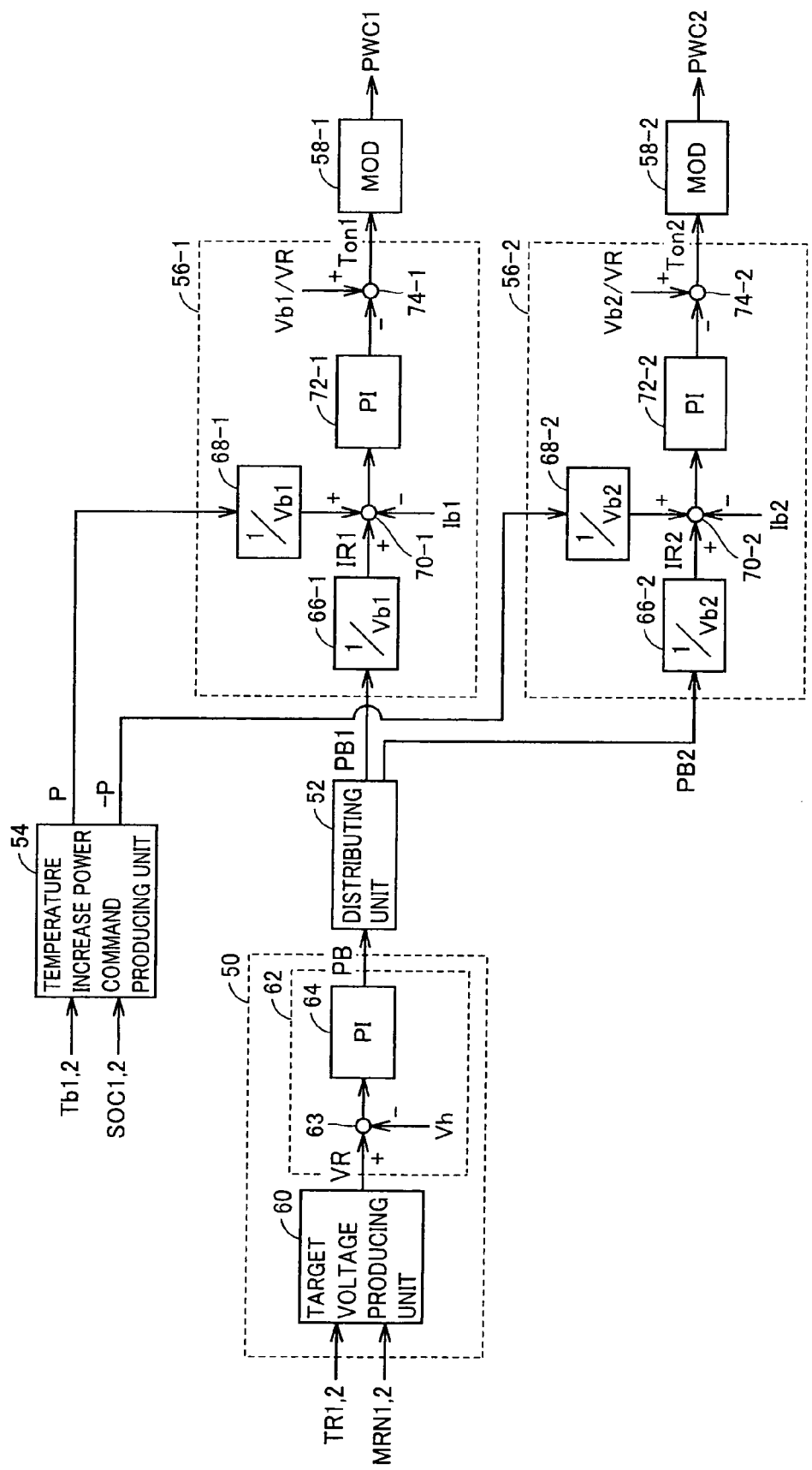
FIG. 3 is a functional block diagram of a converter ECU shown in FIG. 1.

FIG. 3 is a functional block diagram of converter ECU 2 shown in FIG. 1. Referring to FIG. 3, converter ECU 2 includes a power command producing unit 50, a distributing unit 52, a temperature increase power command producing unit 54, current control units 56-1 and 56-2, and modulation units 58-1 and 58-2.

Power command producing unit 50 is formed of a target voltage producing unit 60 and a voltage control unit 62. Voltage control unit 62 is formed of a subtraction unit 63 and a PI control unit 64. Target voltage producing unit 60 calculates a target voltage VR between main positive bus line MPL and main negative bus line MNL based on torque target values TR1 and TR2 and revolution speed target values MRN1 and MRN2 provided from drive ECU 32 (FIG. 1). Subtraction unit 63 subtracts voltage value Vh from target voltage VR, and provides a result of the subtraction to PI control unit 64. PI control unit 64 performs a proportional-plus-integral operation using, as an input, a deviation between target voltage VR and voltage value Vh, and provides a result of this operation to distributing unit 52 as a power command value PB.

Distributing unit 52 divides power command value PB according to a predetermined distribution ratio $\alpha$ ($0 \leq \alpha \leq 1$) into power command values PB1 and PB2 for converters 8-1 and 8-2, outputs power command values PB1 and PB2 to current control units 56-1 and 56-2, respectively. Distribution ratio $\alpha$ may depend on, e.g., a required power of motor generators MG1 and MG2. More specifically, when the required power is larger than a reference value, distribution ratio $\alpha$ is set to a value other than 0 and 1 for performing parallel driving of converters 8-1 and 8-2. When the required power is smaller than the reference value, distribution ratio $\alpha$ is set to 0 or 1 for driving only one of converters 8-1 and 8-2.

When one or both of temperatures Tb1 and Tb2 of power storage devices 6-1 and 6-2 are lowered than a specified value, temperature increase power command producing unit 54 produces a temperature increase power command value P for transferring a power between power storage devices 6-1 and 6-2 via converters 8-1 and 8-2 as well as main positive bus line MPL and main negative bus line MNL for the purpose of increasing a temperature of the power storage devices. This temperature increase power command value P is calculated based on temperatures Tb1 and Tb2 as well as state quantities SOC1 and SOC2 of power storage devices 6-1 and 6-2. Temperature increase power command producing unit 54 provides temperature increase power command value P thus produced to current control unit 56-1, and provides a command value (−P) prepared by inverting the sign of temperature increase power command value P to current control unit 56-2.

Current control unit 56-1 is formed of division units 66-1 and 68-1, an arithmetic unit 70-1, a PI control unit 72-1 and a subtraction unit 74-1. Division unit 66-1 divides power command value PB1 provided from distributing unit 52 by voltage value Vb1, and provides a result of this arithmetic to arithmetic unit 70-1 as a target current IR1. Division unit 68-1 divides temperature increase power command value P provided from temperature increase power command producing unit 54 by voltage value Vb1, and provides a result of this arithmetic to arithmetic unit 70-1.

Arithmetic unit 70-1 subtracts current value Ib1 from a target current obtained by adding an output of division unit 68-1 to target current IR1, and provides a result of this arithmetic to PI control unit 72-1. PI control unit 72-1 performs a proportional-plus-integral operation based on the output of arithmetic unit 70-1, and provides a result of this operation to subtraction unit 74-1. Subtraction unit 74-1 subtracts the output of PI control unit 72-1 from an inverse of a theoretical boost ratio of converter 8-1 represented by (voltage value Vb1)/(target voltage VR), and provides a result of this arithmetic to modulation unit 58-1 as a duty command Ton1. The input term (voltage value Vb1)/(target voltage VR) in this subtraction unit 74-1 is a voltage feedforward (which may also be referred to as a "voltage FF" hereinafter) compensation term based on the theoretical boost ratio of converter 8-1.

Modulation unit 58-1 produces drive signal PWC1 based on duty command Ton1 and a carrier wave produced by an oscillation unit (not shown), and provides drive signal PWC1 thus produced to transistors Q1A and Q1B of converter 8-1.

Current control unit 56-2 is formed of division units 66-2 and 68-2, an arithmetic unit 70-2, a PI control unit 72-2 and a subtraction unit 74-2. Division unit 66-2 divides power command value PB2 provided from distributing unit 52 by voltage value Vb2, and provides a result of this arithmetic to arithmetic unit 70-2 as a target current IR2. Division unit 68-2 divides command value (−P) provided from temperature increase power command producing unit 54 by voltage value Vb2, and provides a result of this arithmetic to arithmetic unit 70-2.

Arithmetic unit 70-2 subtracts current value Ib2 from a target current obtained by adding an output of division unit 68-2 to target current IR2, and provides a result of this arithmetic to PI control unit 72-2. PI control unit 72-2 performs a proportional-plus-integral operation based on the output of arithmetic unit 70-2, and provides a result of this operation to subtraction unit 74-2. Subtraction unit 74-2 subtracts the output of PI control unit 72-2 from an inverse of a theoretical boost ratio of converter 8-2 represented by (voltage value Vb2)/(target voltage VR), and provides a result of this arithmetic to modulation unit 58-2 as a duty command Ton2. The input term (voltage value Vb2)/(target voltage VR) in this subtraction unit 74-2 is a voltage FF compensation term based on the theoretical boost ratio of converter 8-2.

Modulation unit 58-2 produces drive signal PWC2 based on duty command Ton2 and a carrier wave produced by an oscillation unit (not shown), and provides drive signal PWC2 thus produced to transistors Q2A and Q2B of converter 8-2.

In converter ECU 2, current command producing unit 50 produces a power command value PB indicating a target value of the electric power transferred between power supply system 1 and drive power generating unit 3 based on torque target values TR1 and TR2 of motor generators 34-1 and 34-2 as well as revolution speed target values MRN1 and MRN2 thereof. Distributing unit 52 divides power command value PB into power command values PB1 and PB2 according to predetermined distribution ratio α, and distributes power command values PB1 and PB2 to current control units 56-1 and 56-2, respectively.

When one or both of temperatures Tb1 and TB2 of power storage devices 6-1 and 6-2 are lower than the specified value, temperature increase power command producing unit 54 produces temperature increase power command value P for transferring the power between power storage devices 6-1 and 6-2 for the purpose of increasing a temperature of the power storage devices. Temperature increase power command value P thus produced is provided to current control unit 56-1, and the command value (−P) prepared by inverting the sign of temperature increase power command value P is provided to current control unit 56-2.

Current control unit 56-1 performs the current control on converter 8-1 using, as a target current of converter 8-1, a value obtained by adding a result of division of power command value PB1 by voltage value Vb1 to a result of division of temperature increase power command value P by voltage value Vb1. Current control unit 56-2 performs the current control on converter 8-2 using, as a target current of converter 8-2, a value obtained by adding the result of division of power command value PB1 by voltage value Vb1 to a result of division of the command value (−P) by voltage value Vb1.

Thereby, the power (i.e., electric power) according to power command value PB is transferred between power supply system 1 and drive power generating unit 3, and the power according to temperature increase power command value P is transferred between power storage devices 6-1 and 6-2. Therefore, the power is further transferred between power storage devices 6-1 and 6-2 when the desired power is transferred between power supply system 1 and drive power generating unit 3, and thereby power storage devices 6-1 and 6-2 are rapidly heated.

Figure 4:
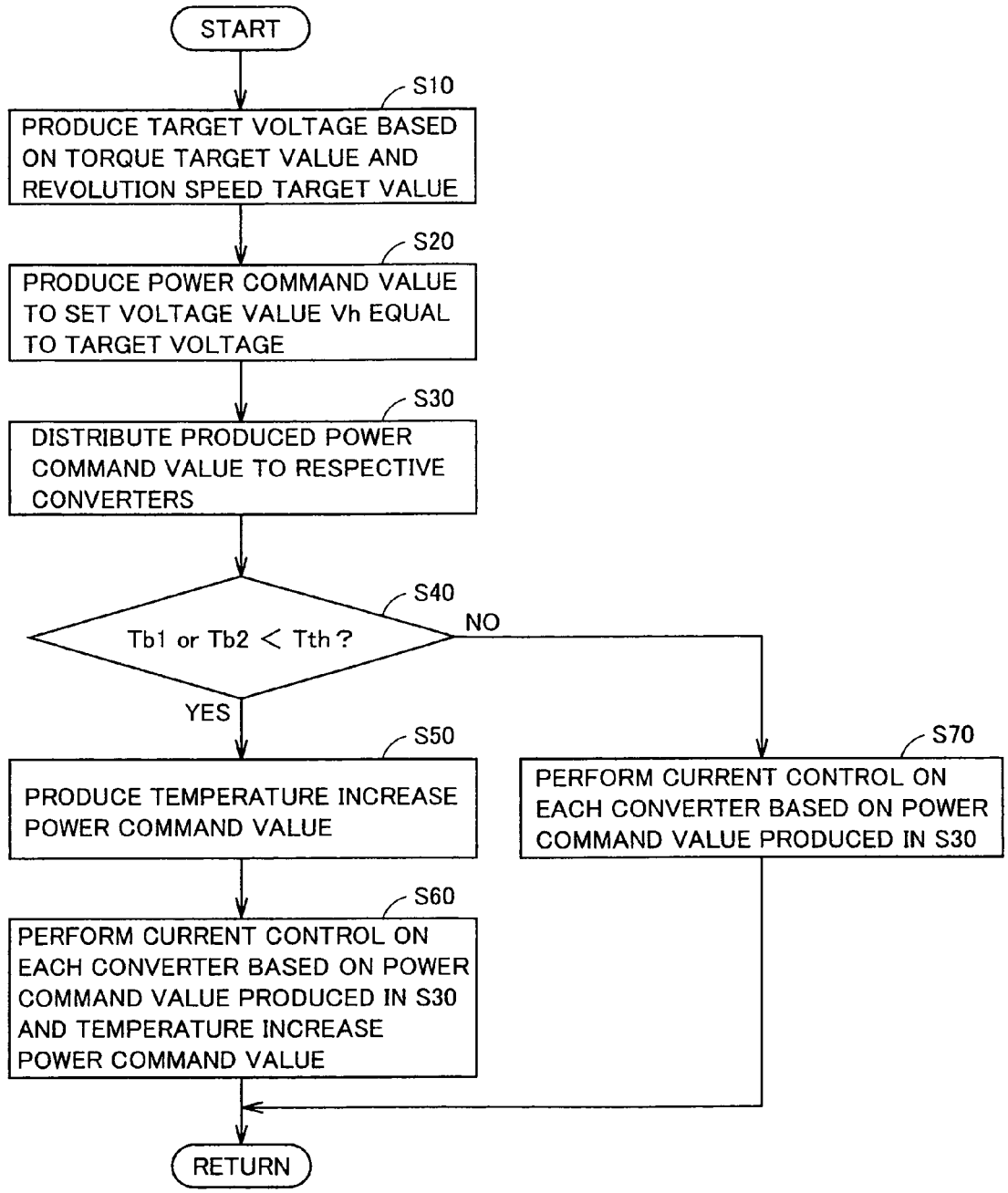
FIG. 4 is a control flowchart of the converter ECU shown in FIG. 1.

FIG. 4 is a control flowchart of converter ECU 2 shown in FIG. 1. The processing illustrated in this flowchart is called for execution from a main routine at predetermined time intervals or when predetermined conditions are satisfied.

Referring to FIG. 4, converter ECU 2 produces target voltage VR between main positive bus line MPL and main negative bus line MNL based on torque target values TR1 and TR2 and revolution speed target values MRN1 and MRN2 of motor generators MG1 and MG2 provided from drive ECU 32 (step S10).

Then, converter ECU 2 produces power command value PB such that voltage value Vh indicating the voltage between main positive bus line MPL and main negative bus line MNL becomes equal to target voltage VR (step S20). Converter ECU 2 distributes power command value PB by dividing it into power command values PB1 and PB2 according to predetermined distribution ratio α (step S30).

Then, converter ECU 2 determines whether temperature Tb1 of power storage device 6-1 or temperature Tb2 of power storage device 6-2 is lower than a preset threshold temperature Tth (e.g., of −10° C.) or not (step S40).

When converter ECU 2 determines that temperature Tb1 or Tb2 is lower than threshold temperature Tth (YES in step S40), it produces temperature increase power command value P for transferring the power between power storage devices 6-1 and 6-2 based on temperatures Tb1 and Tb2 as well as state quantities SOC1 and SOC2, for the purpose of increasing a temperature of the power storage device (step S50).

Converter ECU 2 performs the current control on converter 8-1 based on power command value PB1 and temperature increase power command value P produced in step S30, and performs the current control on converter 8-2 based on power command value PB2 and the command value (−P) prepared by inverting the sign of temperature increase power command value P. More specifically, converter ECU 2 performs the current control on converter 8-1 using, as the target current, a sum of the value obtained by dividing power command value PB1 by voltage value Vb1 and the value obtained by dividing temperature increase power command value P by voltage value Vb1. Also, converter ECU 2 performs the current control on converter 8-2 using, as the target current, a sum of the value obtained by dividing power command value PB2 by voltage value Vb2 and the value obtained by dividing the command value (−P) by voltage value Vb2.

Conversely, when it is determined in step S40 that both temperatures Tb1 and Tb2 are equal to or higher than threshold temperature Tth (NO in step S40), converter ECU 2 does not produce temperature increase power command value P. Therefore, converter ECU 2 performs the current control on converters 8-1 and 8-2 based on power command values PB1 and PB2 produced in step S30 (step S70).

According to the first embodiment, as described above, temperature increase power command value P for transferring the power between power storage devices 6-1 and 6-2 is provided to current control unit 56-1, and the command value (−P) prepared by inverting the sign of temperature increase power command value P is provided to current control unit 56-2. Current control unit 56-1 performs the current control on converter 8-1 based on temperature increase power command value P and power command value PB1 provided for transferring the power between power storage device 6-1 and drive power generating unit 3, and current control unit 56-2 performs the current control on converter 8-2 based on the command value (−P) and power command value PB2 provided for transferring the power between power storage device 6-2 and drive power generating unit 3.

In this first embodiment, therefore, the power according to power command value PB is transferred between power supply system 1 and drive power generating unit 3, and further, during the temperature increase control, the power according to temperature increase power command value P is transferred between power storage devices 6-1 and 6-2. Thereby, power storage devices 6-1 and 6-2 can be rapidly heated. Further, according to the first embodiment, it is not necessary to employ a current control unit dedicated to the temperature increase control. Therefore, the temperature increase control can be performed by a simple structure.

Modification of the First Embodiment

Figure 5:
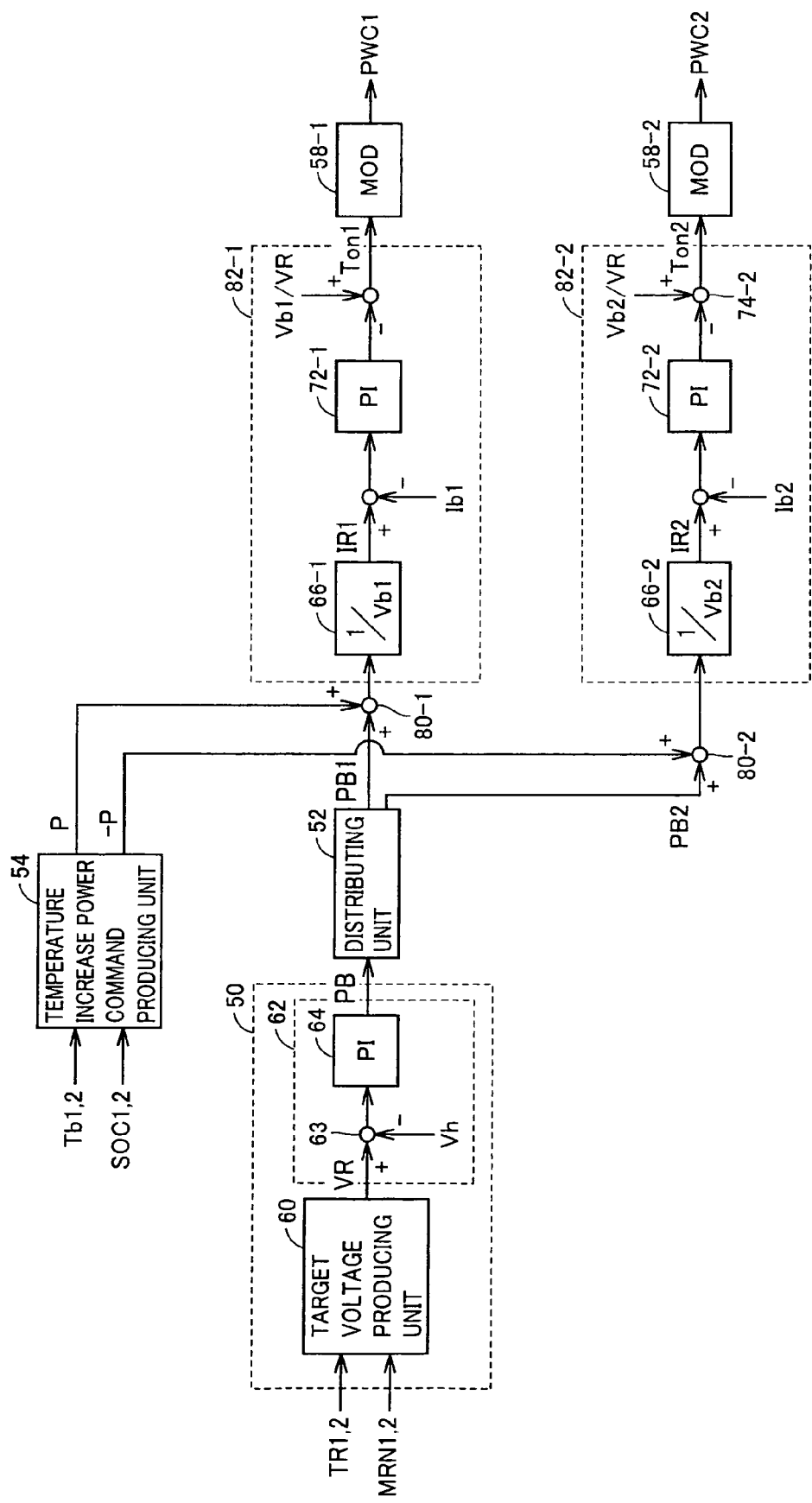
FIG. 5 is a functional block diagram of the converter ECU of a modification of the first embodiment.

FIG. 5 is a functional block diagram of a converter ECU according to a modification of the first embodiment. Referring to FIG. 5, this converter ECU 2A has substantially the same structure as converter ECU 2 shown in FIG. 3 in that converter ECU 2A further includes addition units 80-1 and 80-2, and includes current control units 82-1 and 82-2 instead of current control units 56-1 and 56-2, respectively.

Addition unit 80-1 adds temperature increase power command value P provided from temperature increase power command producing unit 54 to power command value PB1 provided from distributing unit 52, and provides a result of this operation to current control unit 82-1. Addition unit 80-2 adds the command value (−P) provided from temperature increase power command producing unit 54 to power command value PB2 provided from distributing unit 52, and provides a result of this operation to current control unit 82-2.

Current control unit 82-1 has the same structure as current control unit 56-1 except for that division unit 68-1 is not employed. Current control unit 82-2 has the same structure as current control unit 56-2 except for that division unit 68-2 is not employed.

In converter ECU 2A, the power command value prepared by adding temperature increase power command value P to power command value PB1 is provided to current control unit 82-1. Current control unit 82-1 performs the current control on converter 8-1 using, as target current IR1 of converter 8-1, the value obtained by dividing the provided power command value by voltage value Vb1. Also, the power command value prepared by adding the command value (−P) to power command value PB2 is provided to current control unit 82-2. Current control unit 82-2 performs the current control on converter 8-2 using, as target current IR2 of converter 8-2, the value obtained by dividing the provided power command value by voltage value Vb2.

Figure 6:
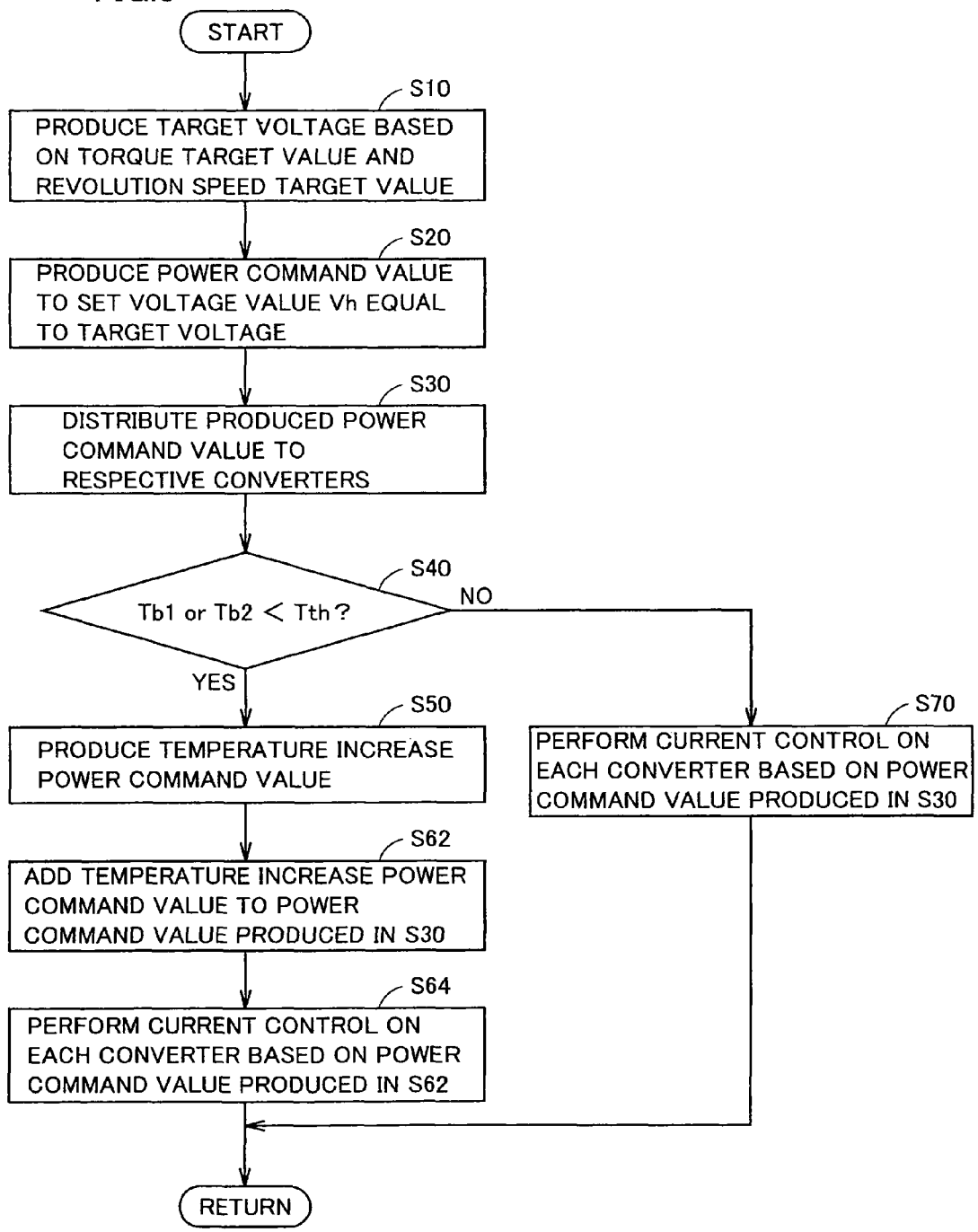
FIG. 6 is a control flowchart of the converter ECU of the modification of the first embodiment.

FIG. 6 is a control flowchart of converter ECU 2A in the modification of the first embodiment. The processing illustrated in this flowchart is likewise called for execution from the main routine at predetermined time intervals or when predetermined conditions are satisfied.

Referring to FIG. 6, this flowchart differs from that of FIG. 4 in that steps S62 and S64 are employed instead of step S60. More specifically, when temperature increase power command value P is produced in step S50, converter ECU 2A adds temperature increase power command value P to power command value PB1 produced in step S30, and adds the command value (−P) prepared by inverting the sign of temperature increase power command value P to power command value PB2 produced in step S30 (step S62).

Converter ECU 2A performs the current control on converter 8-1 based on the power command value prepared by adding temperature increase power command value P to power command value PB1, and performs the current control on converter 8-2 based on the power command value prepared by adding the command value (−P) to power command value PB2 (step S64).

According to the modification of the first embodiment, division units 68-1 and 68-2 can be eliminated so that a quantity of arithmetic can be smaller than that in the first embodiment.

Second Embodiment

This invention can be applied to the case where the power supply system includes three of more power storage devices. In a second embodiment described below, the power supply system includes three of more power storage devices.

Figure 7:
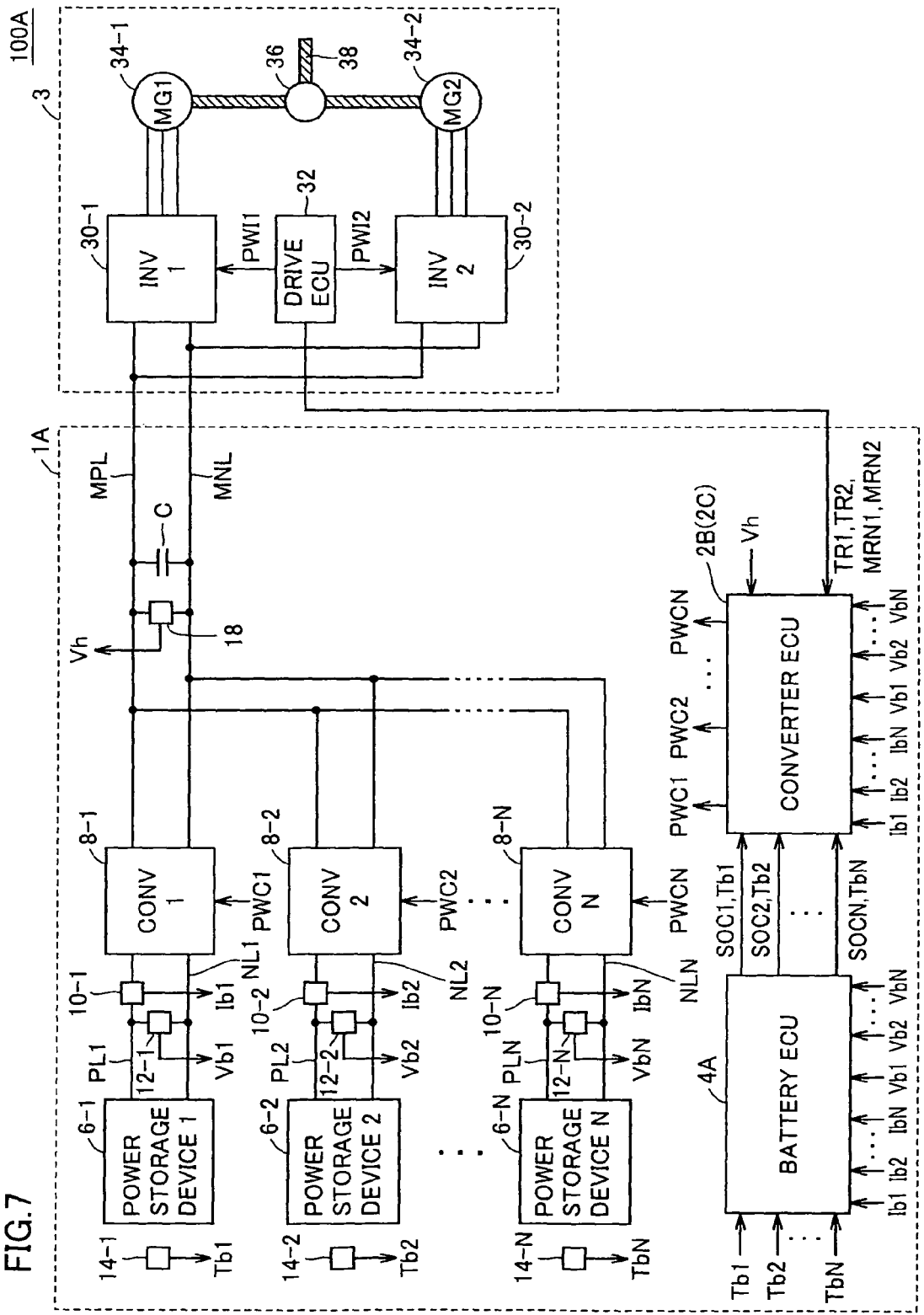
FIG. 7 is an overall block diagram of a vehicle equipped with a power supply system according to a second embodiment.

FIG. 7 is an overall block diagram of a vehicle equipped with a power supply system according to the second embodiment. Referring to FIG. 7, a vehicle 100A has substantially the same structure as vehicle 100 shown in FIG. 1 except for that power supply system 1 is replaced with a power supply system 1A. Power supply system 1A includes power storage devices 6-1, 6-2, . . . and 6-N (N is a natural number larger than two), converters 8-1, 8-2, . . . and 8-N, smoothing capacitor C, a converter ECU 2B, a battery ECU 4A, current sensors 10-1, 10-2, . . . and 10-N, voltage sensors 12-1, 12-2, . . . 12-N and 18, and temperature sensors 14-1, 14-2, . . . and 14-N.

Similarly to power storage devices 6-1 and 6-2, power storage device 6-N is a chargeable and dischargeable DC power supply, and is formed of a secondary battery such as a nickel hydrogen battery or a lithium ion battery. Power storage device 6-N is connected to converter 8-N via positive and negative lines PLN and NLN. Power storage device 6-N may be formed of an electrical double layer capacitor.

Converter 8-N is provided between power storage device 6-N and the pair of main positive bus line MPL and main negative bus line MNL, and performs the voltage conversion between power storage device 6-N and the pair of main positive bus line MPL and main negative bus line MNL based on a drive signal PWCN from converter ECU 2B.

Current sensor 10-N senses a value IbN of a current provided to/from power storage device 6-N, and provides a result of the sensing to converter ECU 2B and battery ECU 4A. Current sensor 10-N senses the current (discharge current) supplied from power storage device 6-N as a positive value, and sense the current (charge current) supplied to power storage device 6-N as a negative value. Current sensor 10-N may sense the current flowing through negative line NLN.

Voltage sensor 12-N senses a voltage value VbN of power storage device 6-N, and provides a result of the sensing to converter ECU 2B and battery ECU 4A. Temperature sensor 14-N senses a temperature TbN of power storage device 6-N, and provides a result of the sensing to battery ECU 4A.

In addition to the function implemented by battery ECU 4, battery ECU 4A calculates a state quantity SOCN that represents the SOC of power storage device 6-N, based on current value IbN from current sensor 10-N, voltage value VbN from voltage sensor 12-N and temperature TbN from temperature sensor 14-N, and provides state quantity SOCN thus calculated to converter ECU 2B together with temperature TbN.

Converter ECU 2B produces drive signals PWC1, PWC2, . . . and PWCN for driving converters 8-1, 8-2 . . . 8-N, based on various sensed values provided from current sensors 10-1, 10-2, . . . and 10-N, and voltage sensors 12-1, 12-2, . . . , 12-N and 18, based on temperatures Tb1, Tb2, . . . and TbN, and state quantities SOC1, SOC2, . . . and SOCN provided from battery ECU 4, and based on torque target values TR1 and TR2, and revolution speed target values MRN1 and MRN2 provided from drive ECU 32. Converter ECU 2B provides drive signals PWC1, PWC2, . . . and PWCN thus produced to converters 8-1, 8-2, . . . and 8-N for controlling converters 8-1, 8-2, . . . and 8-N, respectively.

Figure 8:
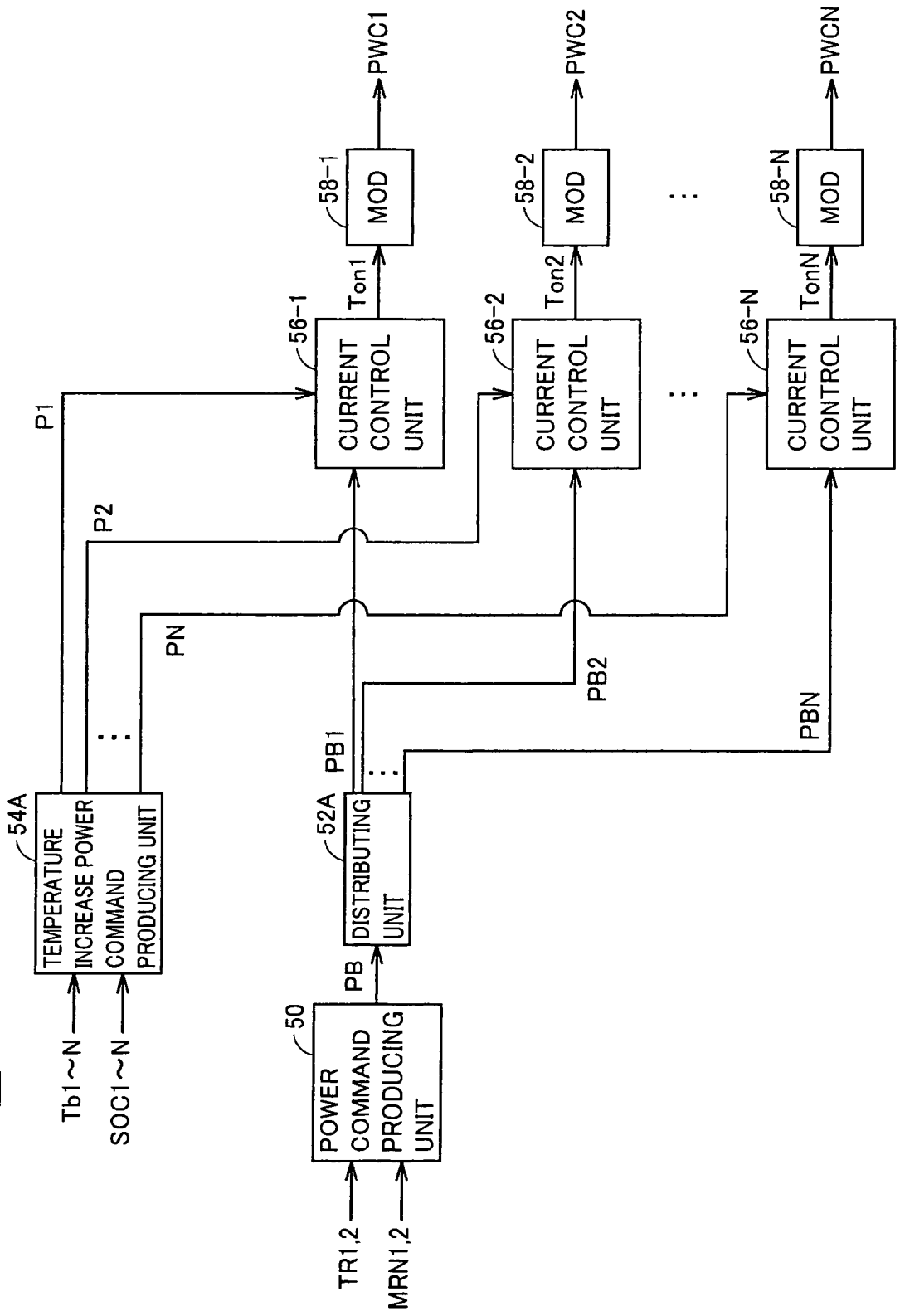
FIG. 8 is a functional block diagram of a converter ECU shown in FIG. 7.

FIG. 8 is a functional block diagram of converter ECU 2B shown in FIG. 7. Referring to FIG. 8, converter ECU 2B includes power command producing unit 50, a distributing unit 52A, a temperature increase power command producing unit 54A, current control units 56-1, 56-2, . . . and 56-N, and modulation units 58-1, 58-2, . . . and 58-N.

Distributing unit 52A divides power command value PB into power command values PB1, PB2, . . . and PBN according to the predetermined distribution ratio, and distributes these power command values PB1, PB2, . . . and PBN to current control units 56-1, 56-2, . . . and 56-N, respectively. The distribution ratio may be determined based on, e.g., the required powers of motor generators MG1 and MG2, similarly to the first embodiment.

Temperature increase power command producing unit 54A produces temperature increase power command values P1-PN for transferring the power between power storage devices 6-1, 6-2, . . . and 6-N for the purpose of increasing a temperature of the power storage devices when at least one of temperatures Tb1, Tb2, . . . and TbN of power storage devices 6-1, 6-2, . . . and 6-N is lower than a specified value. In this example, temperature increase power command producing unit 54A produces temperature increase power command values P1-PN so that the sum of temperature increase power command values P1-PN becomes equal to zero. Temperature increase power command producing unit 54A may be configured such that the temperature increase power command value corresponding to the power storage device of which temperature is equal to or higher than the specified value is equal to zero provided that the sum of temperature increase power command values P1-PN becomes equal to zero. Temperature increase power command producing unit 54A provides temperature increase power command values P1-PN thus produced to current control units 56-1, 56-2, . . . and 56-N, respectively.

Current control unit 56-N performs the current control on converter 8-N based on current command value PBN provided from distributing unit 52A and temperature increase power command value PN provided from temperature increase power command producing unit 54A. Current control unit 56-N produces a duty command TonN for converter 8-N, and provides duty command TonN thus produced to modulation unit 58-N. Current control unit 56-N has substantially the same structure as other current control units 56-1 and 56-2.

Module unit 58-N produces drive signal PWCN based on duty command TonN and a carrier wave produced by an oscillator (not shown), and provides drive signal PWCN thus produced to converter 8-N.

In this converter ECU 2B, when at least one of temperatures Tb1, Tb2, . . . and TbN of power storage devices 6-1, 6-2, . . . and 6-N is lower than the specified value, temperature increase power command producing unit 54A produces temperature increase power command values P1-PN, and provides them to current control units 56-1, 56-2, . . . and 56-N, respectively. Since temperature increase power command producing unit 54A produces temperature increase power command values P1-PN such that the sum of temperature increase power command values P1-PN becomes equal to zero, the power is further transferred between the power storage devices when the desired power is transferred between power supply system 1A and drive power generating unit 3, and therefore the power storage devices are rapidly heated.

According to the second embodiment, as described above, even in the case where the power supply system includes three of more power storage devices, the power corresponding to power command value PB is transferred between power supply system 1A and drive power generating unit 3, and further the powers according to temperature increase power command values P1-PN are transferred during the temperature increase control so that the power storage devices can be rapidly heated.

Modification of the Second Embodiment

Figure 9:
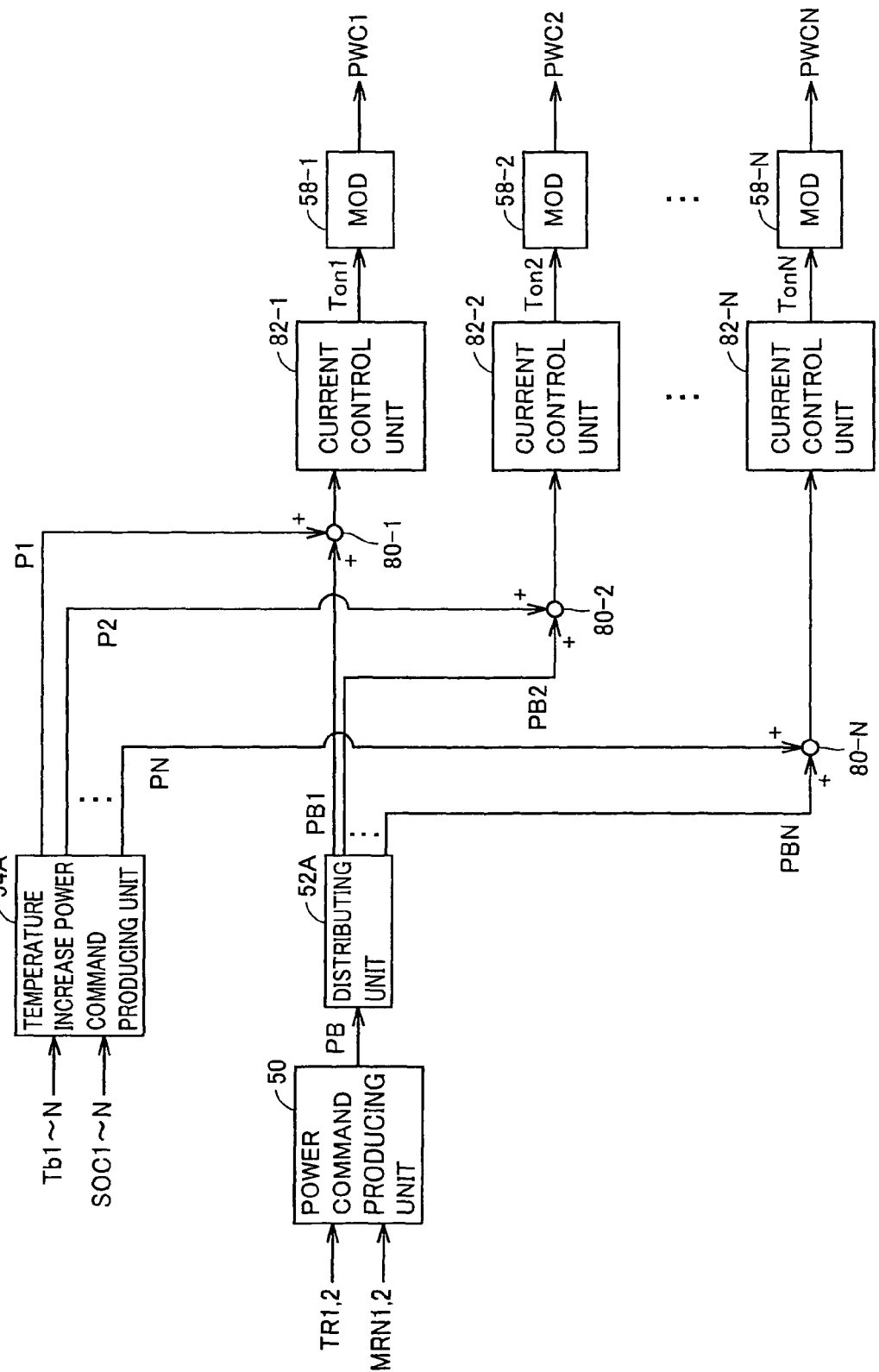
FIG. 9 is a functional block diagram of a converter ECU of a modification of the second embodiment.

FIG. 9 is a functional block diagram of a converter ECU according to a modification of the second embodiment. Referring to FIG. 9, a converter ECU 2C has substantially the same structure as converter ECU 2B shown in FIG. 8 except for that converter ECU 2C further includes addition units 80-1, 80-2, . . . and 80-N, and also includes current control units 82-1, 82-2, . . . and 82-N instead of current control units 56-1, 56-2, . . . and 56-N.

Addition unit 80-N adds temperature increase power command value PN provided from temperature increase power command producing unit 54A to power command value PBN provided from distributing unit 52A, and provides a result of this operation to current control unit 82-N. Current control unit 82-N performs the current control on converter 8-N based on the power command value prepared by adding temperature increase power command value PN to power command value PBN. Current control unit 82-N has substantially the same structures as other current control units 82-1 and 82-2.

In this converter ECU 2C, the power command value prepared by adding temperature increase power command value PNi to power command value PBi (i is a natural number from 1 to N) is provided to current control unit 82-i. Current control unit 82-i obtains a value by dividing this power command value by voltage value Vbi, and performs the current control on converter 8-i using the obtained value as target current IRi.

The modification of the second embodiment can eliminate division units 68-i of N in number, and therefore can reduce the quantity of arithmetic as compared with the second embodiment.

In each of the embodiments already described, the control of converter ECUs 2 and 2A-2C may be implemented by circuits having the functions corresponding to the respective blocks illustrated in the functional block diagrams, and also may be implemented by converter ECUs 2 and 2A-2C executing the processing according to preset programs. In the latter case, a CPU (Central Processing Unit) controls converter ECUs 2 and 2A-2C. The CPU reads, from a ROM (Read Only Memory), programs for executing the processing illustrated in the functional blocks and flowcharts already described, and executes the programs to perform the processing according to the foregoing functional blocks and flowcharts. Therefore, the ROM corresponds to a computer-readable (CPU-readable) recording medium bearing the programs for executing the processing illustrated in the foregoing functional blocks and flowcharts.

In the above description, main positive bus line MPL and main negative bus line MNL correspond to the "power line" in the invention, and converters ECUs 2 and 2A-2C correspond to the "control device" in the invention. Power command producing unit 50 and distributing unit 52 (or 52A) correspond to the "first command producing unit" in the invention, and temperature increase power command producing units 54 and 54A correspond to the "second command producing unit" in the invention. Further, current control units 56-1, 56-2, . . . and 56-N or current control units 82-1, 82-2, . . . and 82-N form the "control unit" in the invention, and inverters 30-1 and 30-2 as well as motor generators 34-1 and 34-2 form the "drive power generating unit" in the invention.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A power supply system capable of transferring power to and from a load device, comprising
   first and second chargeable power storage devices;
   a power line for transferring power between the power supply system and said load device;
   first and second converters provided corresponding to said first and second power storage devices, respectively, and each performing voltage conversion between the corresponding power storage device and said power line; and
   a control device controlling said first and second converters, wherein
   said control device includes:
   a first command producing unit producing a first power command for transferring power between the power supply system and said load device,
   a second command producing unit producing a second power command for transferring a power between said first and second power storage devices when temperature increase control is performed for increasing a temperature of at least one of said first and second power storage devices, and a control unit controlling said first and second converters such that the power indicated by said first power command is transferred between the power supply system and said load device, and power indicated by said second power command is transferred between said first and second power storage devices, said first command producing unit divides said first power command into a first command value for said first converter and a second command value for said second converter in accordance with a predetermined distribution ratio, said second command producing unit produces, as said second power command, a third command value for said first converter and a fourth command value for said second converter prepared by inverting a sign of said third command value, and said control unit controls said first converter based on a command value prepared by adding said third command value to said first command value and controls said second converter based on a command value prepared by adding said fourth command value to said second command value.

2. The power supply system according to claim 1, wherein said second command producing unit produces said second power command when a temperature of at least one of said first and second power storage devices is lower than a specified value.

3. The power supply system according to claim 1, wherein said first command producing unit produces said first power command such that a voltage on said power line attains a predetermined value.

4. A vehicle comprising:
the power supply system according to claim 1; and
a drive power generating unit generating drive power of the vehicle by receiving power supplied from said power supply system.

5. A control method of a power supply system capable of transferring power to and from a load device, said power supply system including
first and second chargeable power storage devices,
a power line for transferring a power between the power supply system and said load device, and
first and second converters provided corresponding to said first and second power storage devices, respectively, and each performing voltage conversion between the corresponding power storage device and said power line,
said control method comprising:
a first step of producing a first power command for transferring a power between said power supply system and said load device, a second step of producing a second power command for transferring a power between said first and second power storage devices when temperature increase control is performed for increasing a temperature of at least one of said first and second power storage devices, and a third step of controlling said first and second converters such that power indicated by said first power command is transferred between said power supply system and said load device, and power indicated by said second power command is transferred between said first and second power storage devices, said first step including the step of dividing said first power command into a first command value for said first converter and a second command value for said second converter in accordance with a predetermined distribution ratio, said second step including the step of producing, as said second power command, a third command value for said first converter and a fourth command value for said second converter prepared by inverting a sign of said third command value, and said third step including the step of controlling said first converter based on a command value prepared by adding said third command value to said first command value and controlling said second converter based on a command value prepared by adding said fourth command value to said second command value.

6. The control method according to claim 5, wherein
in said second step, said second power command is produced when a temperature of at least one of said first and second power storage devices is lower than a specified value.

7. The control method according to claim 5, wherein
in said first step, said first power command is produced such that a voltage on said power line attains a predetermined value.

8. A computer-readable recording medium bearing a program for causing a computer to execute the control method according to claim 5.

9. A vehicle comprising:
the power supply system according to claim 2; and
a drive power generating unit generating drive power of the vehicle by receiving power supplied from said power supply system.

10. A vehicle comprising:
the power supply system according to claim 3; and
a drive power generating unit generating drive power of the vehicle by receiving power supplied from said power supply system.

11. A computer-readable recording medium bearing a program for causing a computer to execute the control method according to claim 6.

12. A computer-readable recording medium bearing a program for causing a computer to execute the control method according to claim 7.

* * * * *